United States Patent
Kumar et al.

(10) Patent No.: US 12,515,223 B2
(45) Date of Patent: Jan. 6, 2026

(54) 3D-TAPERED NANOCAVITIES WITH ON-CHIP OPTICAL AND MOLECULAR CONCENTRATION FOR SINGLE MOLECULE DIAGNOSTICS

(71) Applicant: Samsung Electronics Co., Ltd., Suwon-si (KR)

(72) Inventors: Shailabh Kumar, Pasadena, CA (US); Haeri Park Hanania, San Gabriel, CA (US); Radwanul Hasan Siddique, Monrovia, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 610 days.

(21) Appl. No.: 18/075,302

(22) Filed: Dec. 5, 2022

(65) Prior Publication Data

US 2024/0131515 A1 Apr. 25, 2024

Related U.S. Application Data

(60) Provisional application No. 63/418,957, filed on Oct. 24, 2022.

(51) Int. Cl.
*B01L 3/00* (2006.01)
*G02B 6/42* (2006.01)

(52) U.S. Cl.
CPC .......... *B01L 3/502761* (2013.01); *G02B 6/42* (2013.01); *G02B 6/4203* (2013.01);
(Continued)

(58) Field of Classification Search
CPC ............... G01N 21/648; G01N 21/658; G01N 33/54326; G01N 33/54346;
(Continued)

(56) References Cited

U.S. PATENT DOCUMENTS 9,052,450 B2    6/2015  Choo et al.
9,823,246 B2   11/2017  Dai et al.
(Continued)

FOREIGN PATENT DOCUMENTS

CN    110607231 A    10/2019
CN    110628597 A    10/2019
(Continued)

OTHER PUBLICATIONS

Verschueren, D.V., et al., "Label-Free Optical Detection of DNA Translocations through Plasmonic Nanopores," ACS NANO, 2019, vol. 13, pp. 61-70.
(Continued)

*Primary Examiner* — Jennifer Wecker
(74) *Attorney, Agent, or Firm* — Womble Bond Dickinson (US) LLP

(57) ABSTRACT

A plasmonic device including a support layer extending along a first direction and a second direction, an insulating layer on the support layer, and a plasmonic layer on the insulating layer and defining a cavity extending along the first direction, the cavity having a three-dimensionally (3D) tapered structure and being configured to propagate an electromagnetic field along the first direction and to concentrate the electromagnetic field at a tip of the cavity, wherein the support layer, the insulating layer, and the plasmonic layer define an opening therein, the opening being at the tip of the cavity and being configured to pass-through target molecules of a solution present on the plasmonic layer.

20 Claims, 6 Drawing Sheets

(52) U.S. Cl.
CPC .... *G02B 6/4298* (2013.01); *B01L 2200/0647* (2013.01); *B01L 2300/12* (2013.01); *B01L 2300/161* (2013.01); *B01L 2400/0424* (2013.01)

(58) Field of Classification Search
CPC .. G01N 33/54373; G02B 6/42; G02B 6/4203; G02B 6/4298; B01L 2200/0647; B01L 2300/12; B01L 2300/161; B01L 2400/0424; B01L 3/502761
See application file for complete search history.

(56) References Cited

U.S. PATENT DOCUMENTS

| | | | |
|---|---|---|---|
| 9,863,880 | B2 | 1/2018 | Rothberg et al. |
| 10,047,392 | B2 | 8/2018 | Ivankin et al. |
| 2011/0215705 | A1* | 9/2011 | Long ............ H01J 61/28 313/231.31 |
| 2012/0091365 | A1 | 4/2012 | Moerner et al. |
| 2014/0204372 | A1* | 7/2014 | Pang ............ G01N 21/658 356/244 |
| 2014/0256593 | A1 | 9/2014 | Szmacinski et al. |
| 2015/0253321 | A1 | 9/2015 | Chou et al. |
| 2018/0044725 | A1 | 2/2018 | Kokoris et al. |
| 2019/0064139 | A1 | 2/2019 | Nawarathna et al. |
| 2020/0326282 | A1 | 10/2020 | Singamaneni et al. |
| 2022/0098653 | A1 | 3/2022 | Bowen et al. |
| 2022/0235415 | A1 | 7/2022 | Fretes |

FOREIGN PATENT DOCUMENTS

| | | |
|---|---|---|
| CN | 110628598 A | 12/2019 |
| CN | 110628599 A | 12/2019 |
| CN | 110628601 A | 12/2019 |
| CN | 110669660 A | 1/2020 |
| CN | 110699246 A | 1/2020 |
| CN | 211142037 U | 7/2020 |
| CN | 211142040 U | 7/2020 |
| CN | 211170685 U | 8/2020 |
| CN | 211142041 U | 9/2020 |

OTHER PUBLICATIONS

Shendure, J., et al., "Accurate Multiplex Polony Sequencing of an Evolved Bacterial Genome," Science AAAS, Science 309, 1728 (2005) 6 pages.

Chen, C., et al., "High spatial resolution nanoslit SERS for single-molecule nucleobase sensing," Nature Communications, 2018, 9 pages.

Kumar, S., et al., Overcoming evanescent field decay using 3D-tapered nanocavities for on-chip targeted molecular analysis, Nature Communications, 2020, 9 pages.

European Search Report for EP Application No. 23197084.9 dated Mar. 1, 2024.

* cited by examiner

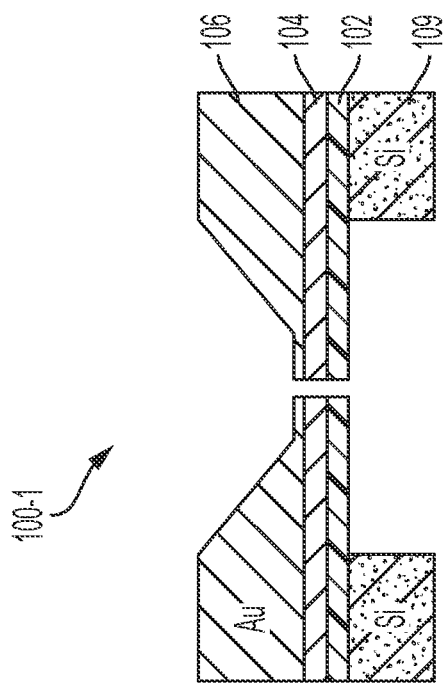
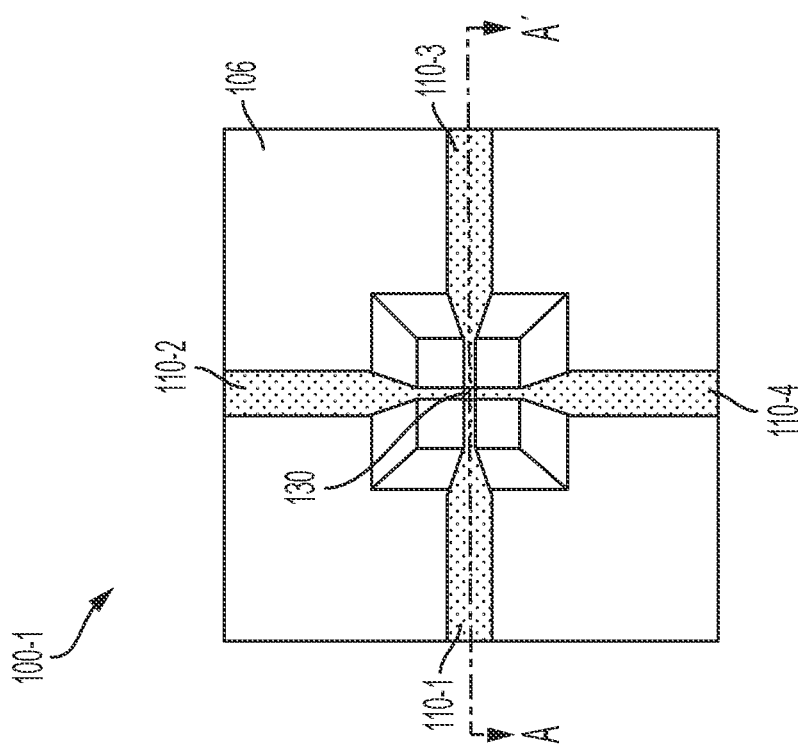
FIG. 3A
FIG. 3B

3D-TAPERED NANOCAVITIES WITH ON-CHIP OPTICAL AND MOLECULAR CONCENTRATION FOR SINGLE MOLECULE DIAGNOSTICS

CROSS-REFERENCE TO RELATED APPLICATION(S)

This application claims priority to, and the benefit of, U.S. Provisional Application No. 63/418,957 ("3D-TAPERED NANOCAVITIES WITH ON-CHIP OPTICAL AND MOLECULAR CONCENTRATION FOR SINGLE MOLECULE DIAGNOSTICS"), filed on Oct. 24, 2022, the entire content of which is incorporated herein by reference.

FIELD

Aspects of the invention relate to the field of molecule sensing systems and methods of using the same.

BACKGROUND

Recently, the need for surveillance and personalized medicine has motivated the development of diagnostics platforms for sensing single molecules. Such diagnostics systems may be used in applications such as fluorescent antibody assays, PCR assays, nucleic acid amplification tests, and DNA or protein sequencing.

Currently, many of these molecule sensing systems suffer from diffusion-limited delivery of analytes, which may lead to longer read times. That results in longer wait time between detection events, and more background fluorescence, which leads to low signal-to-noise ratios (SNRs), greater error, and poor detection sensitivity. Further, such systems generally lack the ability to provide efficient signal enhancement to a broad range of molecules for sensing, such as dyes for sequencing, DNA strands, or antibodies.

What is desired is a device architecture that can improve readout SNR and enable faster and earlier readout for smaller sample sizes.

The above information disclosed in this Background section is only for enhancement of understanding of the background of the invention, and therefore it may contain information that does not form the prior art.

SUMMARY

Aspects of embodiments of the present invention are directed toward a plasmonic device of a diagnostics platform (e.g., a single molecule diagnostics platform) capable of directing the flow of, and concentrate, target molecules at its sensing site and of providing a high degree of optical signal enhancement. In some embodiments, the plasmonic device is a nanostructure that utilizes a cavity with 3-dimensional (3D) tapering with an opening at its end, which is configured to concentrate molecules at the tip of cavity to speed up molecule detection and to amplify the optical readout at the target region, thus enabling improved readout signal-to-noise ratio (SNR) as well as faster and earlier readout for smaller sample concentrations and larger range of molecule sizes.

According to some exemplary embodiments of the present invention, there is provided a plasmonic device including: a support layer extending along a first direction and a second direction; an insulating layer on the support layer; and a plasmonic layer on the insulating layer and defining a cavity extending along the first direction, the cavity having a three-dimensionally (3D) tapered structure and being configured to propagate an electromagnetic field along the first direction and to concentrate the electromagnetic field at a tip of the cavity, wherein the support layer, the insulating layer, and the plasmonic layer define an opening therein, the opening being at the tip of the cavity and being configured to pass-through target molecules of a solution present on the plasmonic layer.

In some embodiments, the cavity exposes the insulating layer in a plan view.

In some embodiments, the cavity has a first cavity portion having a first width and a first thickness, a tapered cavity portion having a tapered width along the first direction and a tapered thickness along a third direction crossing the first and second directions, and a second cavity portion having a second width and a second thickness, and the tip of the cavity is at an end of the second cavity portion.

In some embodiments, the plasmonic layer includes: a first plasmonic portion having the first thickness; a second plasmonic portion having the second thickness; and a tapered plasmonic portion between the first and second plasmonic portions and having the tapered thickness.

In some embodiments, the tapered plasmonic portion is tapered along the third direction.

In some embodiments, the second width is less than the first width, and the second thickness is less than the first thickness.

In some embodiments, the plasmonic layer includes hydrophobic material and the insulating layer includes hydrophilic material, and the insulating layer is configured to attract fluid present on the plasmonic layer into the opening.

In some embodiments, the plasmonic layer includes gold, the insulating layer includes silica, and the support layer includes silicon nitride.

In some embodiments, the support layer is configured to provide structural support to the plasmonic and insulating layers to create a free-hanging structure with both sides of the opening being open, and the plasmonic device further includes an absorbent layer below the support layer, the absorbent layer being configured to absorb fluid leaving a bottom of the opening.

In some embodiments, the opening is a fluidic channel configured to enable passive flow of the solution and concentration of a target molecule of the solution in the opening via at least one of evaporation and surface-tension gradients.

In some embodiments, the opening has a width of 5 nm to 25 nm.

In some embodiments, the plasmonic layer includes gold, the insulating layer includes silica, and the support layer includes ferromagnetic material including at least one of nickel, iron, and cobalt.

In some embodiments, the plasmonic device further includes a substrate below the support layer, wherein the opening exposes a top surface of the substrate in a plan view.

In some embodiments, the solution includes target molecules bound to magnetic nanoparticles, and the opening is configured to enable concentration of the target molecules of the solution in the opening by attracting the magnetic nanoparticles toward a portion of the support layer exposed by the opening.

In some embodiments, the plasmonic layer includes: a first portion including: a first plasmonic portion having a first thickness; a second plasmonic portion having a second thickness; a tapered plasmonic portion between the first and second plasmonic portions and having a tapered thickness; and a second portion electrically isolated from the first portion, wherein the opening is a transverse gap physically separating the second and third plasmonic portions of the plasmonic layer, and wherein the support layer is a substrate defining a bottom of the transverse gap.

In some embodiments, in the presence of an alternating current (AC) electric field across the transverse gap, target molecules of the solution are directed to the opening via dielectrophoresis.

According to some exemplary embodiments of the present invention, there is provided an optical diagnostics system including: a plasmonic device including: a support layer extending along a first direction and a second direction; an insulating layer on the support layer; and a plasmonic layer on the insulating layer and defining a cavity extending along the first direction, the cavity having a three-dimensionally (3D) tapered structure and being configured to propagate an electromagnetic field along the first direction and to concentrate the electromagnetic field at a tip of the cavity, wherein the support layer, the insulating layer, and the plasmonic layer define an opening therein, the opening being at the tip of the cavity and being configured to pass-through target molecules of a solution present on the plasmonic layer; a light source configured to radiate excitation light to the plasmonic device; and a detector configured to detect a return signal from the plasmonic device.

In some embodiments, the return signal is a spectral signal or a fluorescent signal emitted by a fluorophore bound to a target molecule of the solution in response to excitation by the excitation light.

In some embodiments, the cavity is laterally and vertically tapered, and the opening is a fluidic channel configured to enable passive flow of the solution and concentration of a target molecule of the solution in the opening via at least one of evaporation and surface-tension gradients.

According to some exemplary embodiments of the present invention, there is provided a method of performing single-molecule detection, the method including: providing a plasmonic device including: a support layer extending along a first direction and a second direction; an insulating layer on the support layer; and a plasmonic layer on the insulating layer and defining a cavity extending along the first direction, the cavity having a three-dimensionally (3D) tapered structure and being configured to propagate an electromagnetic field along the first direction and to concentrate the electromagnetic field at a tip of the cavity, wherein the support layer, the insulating layer, and the plasmonic layer define an opening therein, the opening being at the tip of the cavity and being configured to pass-through target molecules of a solution present on the plasmonic layer; radiating excitation light toward the plasmonic device; and detecting a return signal from the plasmonic device, the return signal corresponding to the target molecules.

BRIEF DESCRIPTION OF THE DRAWINGS

The above and other features and aspects of the invention will be made more apparent by the following detailed description of exemplary embodiments thereof with reference to the attached drawings, in which:

FIG. 3A illustrates a plan view of a plasmonic device including a plurality of 3D cavities, according to some embodiments of the present invention.

FIG. 3B illustrates a cross-sectional view of the multi-cavity plasmonic device taken along the line AA', according to some embodiments of the present invention.

DETAILED DESCRIPTION

Figure 1:
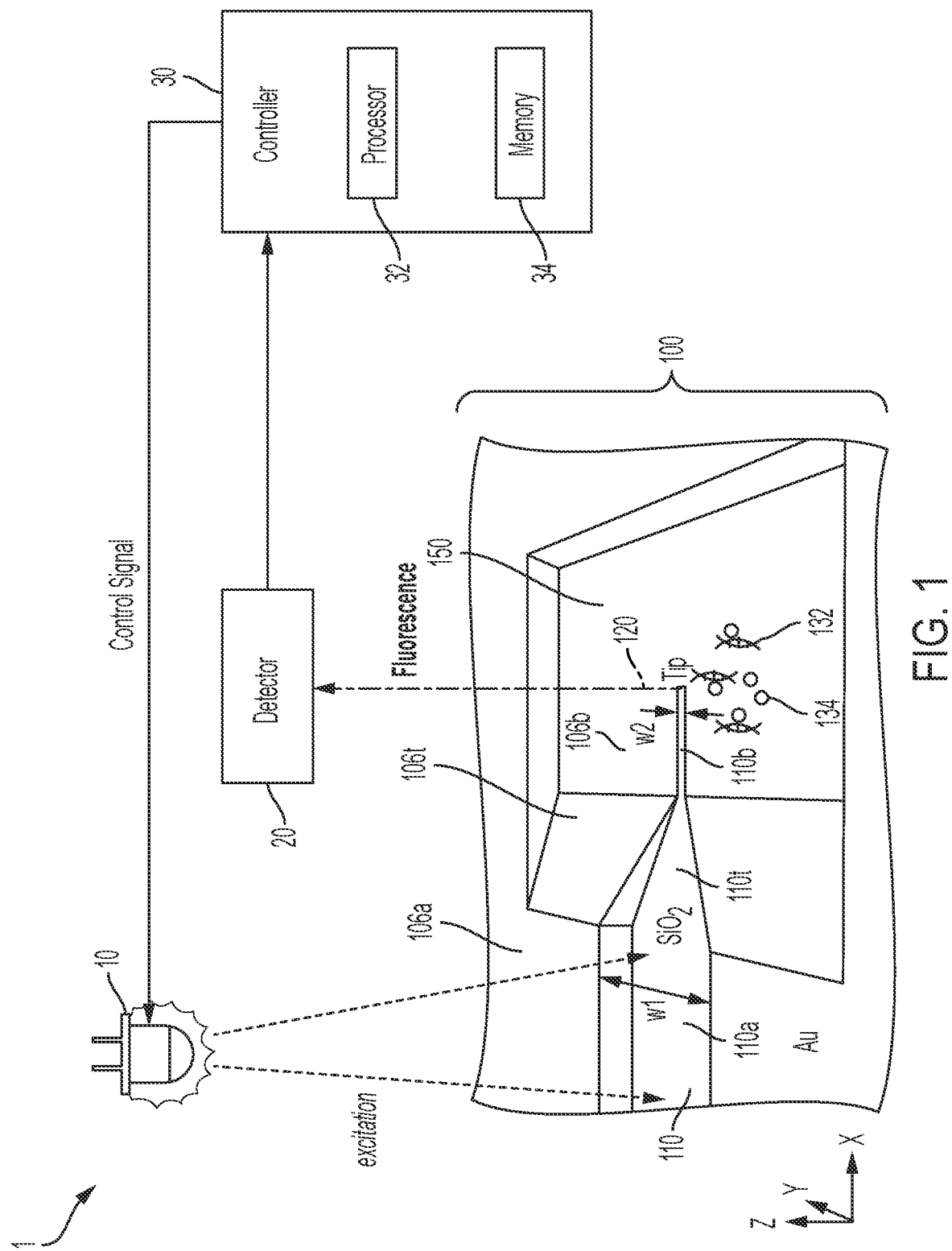
FIG. 1 illustrates a schematic diagram of an optical single-molecule diagnostics system, according to some exemplary embodiments of the present invention.

The attached drawings for illustrating exemplary embodiments of the invention are referred to in order to provide a sufficient understanding of the invention, the merits thereof, and the objectives accomplished by the implementation of the invention. The invention may, however, be embodied in many different forms and should not be construed as being limited to the exemplary embodiments set forth herein; rather, these exemplary embodiments are provided so that this invention will be thorough and complete, and will fully convey the concept of the invention to those skilled in the art.

Hereinafter, the invention will be described in detail by explaining exemplary embodiments of the invention with reference to the attached drawings. In the drawings, like reference numerals are used throughout the figures to reference like features and components.

Aspects of the present invention are directed to a semiconductor-based single-molecule optical diagnostics system including a plasmonic device that has a nanostructure with a 3D-tapered cavity having an opening at its end, which provides fluidic control, concentration of target molecules, and strong optical signal enhancement for diverse molecule sizes. In some embodiments, one or more of passive flow, magnetic gradients, and dielectrophoresis are utilized to direct flow of molecules on the plasmonic device for faster detection.

In some embodiments, the plasmonic device has a 3D-tapered nanopore sensor architecture with on-site molecule concentration for optical detection of single molecules. The plasmonic device may enable sample delivery directly to the sensing hotspot using passive fluid flow through the nanopore, magnetic nanofocusing, or dielectric trapping. The plasmonic device achieves optical enhancement directly at the nanopore site to enable visualization of single molecules for diverse diagnostics including but not limited to antibody and aptamer assays, nucleic acid amplification tests (e.g., polymerase chain reaction (PCR) tests, loop-mediated isothermal amplification (LAMP) tests, etc.) and deoxyribonucleic acid (DNA) and protein sequencing.

According to some embodiments, the diagnostics system is useful for any detection method where molecules are excited by light to emit optical signal (fluorescence, Raman spectroscopy). The diagnostics system operates in configurations where the target molecule itself can fluoresce when excited, the target molecule is recognized by an antibody/binding agent which in turn is tagged with a fluorophore, or the target directly has a unique spectroscopic signature such as Raman spectra (not necessarily fluorescence). The plasmonic device concentrates light (i.e., electromagnetic fields) at the sensor hotspot, so any detection method relying on light to generate output signal may be enhanced.

Figure 2:
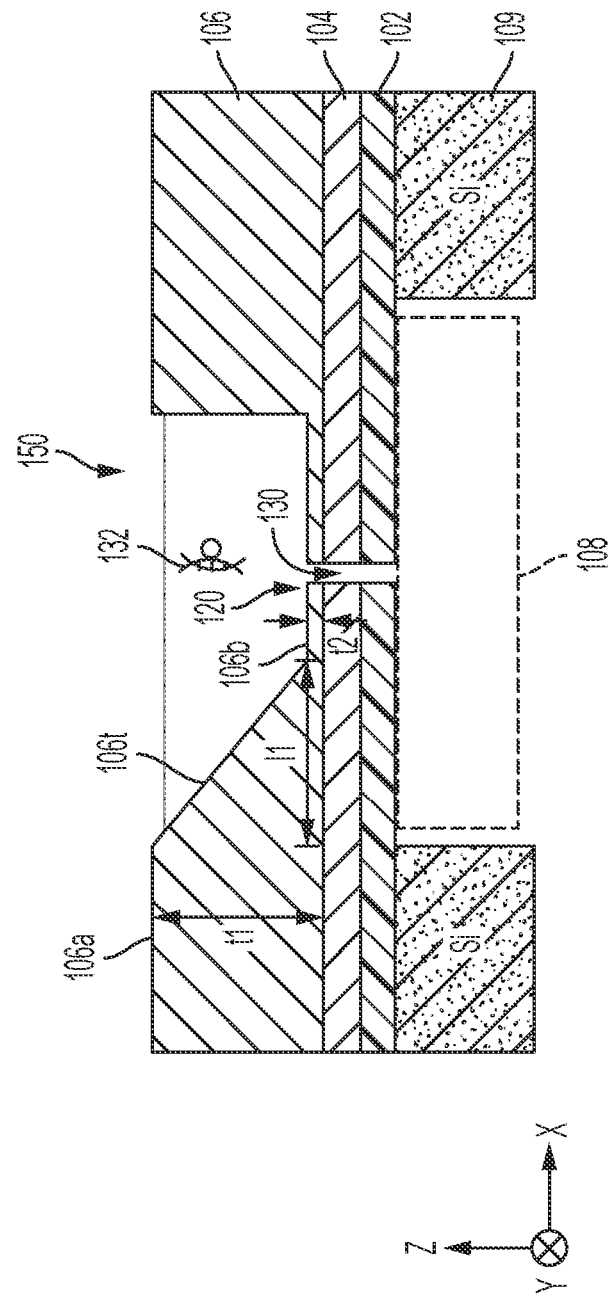
FIG. 2 illustrates a partial cross-sectional view of a plasmonic device of the diagnostics system, according to some embodiments of the present invention.

FIG. 1 illustrates a schematic diagram of an optical diagnostics system 1, according to some exemplary embodiments of the present invention. FIG. 2 illustrates a partial cross-sectional view of the plasmonic device 100, according to some embodiments of the present invention.

Referring to FIG. 1, in some embodiments, the optical diagnostics system (e.g., the single-molecule diagnostics system) 1 includes a light source 10, a detector 20, a controller 30, and a plasmonic device 100.

The light source 10 emits an excitation light toward the plasmonic device 100 based on a control signal from the controller 30. The plasmonic device 100 utilizes a cavity (e.g., a 3D tapered cavity) 110 to propagate the light toward and confine the light at a small hot spot 120 within a well 150 of the device 100. The well 150 is configured to house a solution, which includes target molecules 132 that are to be detected by the diagnostics system 1, fluorophores (e.g., fluorescent molecules) 134 that bind to the target molecules 132 and are sensitive to the excitation light from the light source 10, or direct spectroscopic signal from target molecules 132. The fluorophores 134 effectively act as fluorescent labels for the target molecules 132. When excited by the excitation light from the light source 10, the fluorophores 134 emits a return signal (e.g., a fluorescence light) that is detected by the detector 20. The controller 30 then determines the presence and/or the concentration of the target molecules 132 in the solution based on the strength of the detected signal from the detector 20. The controller 30 may include a processor 32 and a memory 34 local to the processor 32, which has instructions stored thereon that, when executed by the processor, cause the processor to perform the processing operations of the controller 30.

While in some embodiments of the present invention, the returned fluorescent signal is generated by the fluorophores 134, embodiments of the present invention are not limited thereto. For example, the target molecule 132 itself may fluoresce when excited or the target molecule 132 may have a unique spectroscopic signature such as Raman spectra (not necessarily be fluorescence), which may be detected by the detector 20.

In some examples, the light source 10 may emit light in the visible or near-infrared wavelength range of about 400 nm to about 1200 nm. According to some examples, the target molecules 132 may be target deoxyribonucleic acid (DNA) or ribonucleic acid (RNA) strands, proteins, peptides, hormones (e.g., insulin), metabolites (e.g., glucose), and other small molecules. fluorophores 134 may include fluorescein, rhodamine, cyanine, BODIPY-FL, 7-nitrobenz-2-oxa-1, 3-diazole-4-yl, naphthalimide (lucifer yellow), acridine orange, alexa fluor dyes and/or the like.

In some embodiments, the detector 20, which may include a plurality of pixel arrays, provides high detection sensitivity (e.g., single-photon sensitivity) to enable sensing of single target molecules. For example, the detector 20 may include a visible wavelength photodetector, spectrometer, cooled infrared photodetector based on narrow- or wide bandgap semiconductors, or may be an uncooled photodetector based on pyroelectric and ferroelectric materials, resistive or capacitive microbolometer and/or magnetic based transistors. In some examples, the detector 20 may include a plurality of avalanche photodiodes (APDs), a quanta image sensor (QIS), a plurality of single-photon avalanche diode (SPAD), and/or the like. The high detection sensitivity of the detector 20 allows the diagnostics system 1 to lower the detection threshold value relative to the related art, thereby considerably reducing detection/assay time.

Referring to FIGS. 1 and 2, according to some embodiments, the plasmonic device 100 includes a support layer 102 extending along a first direction (e.g., the X direction) and a second direction (e.g., the Y direction), an insulating layer 104 on the support layer 102, and a plasmonic layer 106 on the insulating layer 104 that defines a cavity (e.g., a nanocavity) 110 extending along the first direction. The cavity 110 has a three-dimensionally (3D) tapered structure (e.g., a 3D linearly tapered structure) that is configured to propagate an electromagnetic field generated by coupling the excitation light along the first direction (e.g., the X direction) and to concentrate the electromagnetic field at the tip 120 of the cavity 110. The support layer 102, the insulating layer 104, and the plasmonic layer 106 define an opening (e.g., a through-hole, a nanopore, or a nanoslit) 130 therein. The opening 130 may be at the tip of the cavity and may act as a fluidic/biomolecule transport channel, which is configured to pass-through target molecules 132 of a solution present in the well 150 of the plasmonic layer 106.

In some embodiments, the plasmonic layer 106 includes a first plasmonic portion 106a having a first thickness t1, a second plasmonic portion 106b having a second thickness t2, and a tapered plasmonic portion 106t between the first and second plasmonic portions 106a and 106b and having a tapered thickness (e.g., a linearly tapered/decreasing thickness) and a length of l1.

The cavity 110 has a first cavity portion 110a having a first width w1 and the first thickness t1, a tapered cavity portion 110t having a tapered width along the first direction (e.g., the X direction) and a tapered thickness along the third direction (e.g., the Z direction) and a second cavity portion 110b having a second width w2 and the second thickness t2. Here, the second width w2 is less than the first width w1, and the second thickness t2 is less than the first thickness t1. The tapered cavity portion 110t tapers vertically along the third direction (i.e., the Z direction) and laterally in the plane define by the first and second directions (i.e., the X and Y directions) into the nanochannel of the second cavity portion 110b.

In some examples, the first width may be about 100 nm to about 350 nm (e.g., about 150 nm), the second width may be about 5 nm to about 25 nm (e.g., about 20 nm), the first thickness may be about 50 nm to about 300 nm (e.g., about 150 nm), the second thickness may be about 30 nm to about 200 nm (e.g., 30 nm), and the length l1 may be about 20 nm to about 1000 nm (e.g., about 500 nm). The lateral and vertical taper angles of the tapered cavity portion 110t may be about 10° to about 25° (e.g., about 18.5°). However, embodiments of the present invention are not limited thereto, and the widths, thicknesses, length, and taper angles may assume any suitable values.

The cavity 110, which acts as a waveguide, may represent a portion of the plasmonic layer 106 that is etched away (e.g., removed by ion milling) and that exposes the insulating layer 104 in a plan view. The plasmonic layer 106, which forms the sidewalls of the cavity 110 has plasmonic properties and high electrical conductivity, which allow the excitation light to be efficiently captured and propagated along the length of the cavity (e.g., along the first or X direction). The plasmonic properties of the plasmonic layer 106, which may result from coherent electron oscillations at the cavity walls traveling together with the electromagnetic wave within the cavity 110, give rise to strong light-matter interactions, in particular at the metal-insulator interfaces at edges of the cavity 110 where the conductive walls of the plasmonic layer 106 meet the insulator layer 104. Further, the high electrical conductivity of the plasmonic layer 106 results in low ohmic losses and greater propagation length, which enhances the propagation of the electromagnetic field along the cavity waveguide. In some examples, the plasmonic layer 106 includes gold (Au), silver (Ag), aluminum (Al), gallium nitride (GaN), and/or the like. The choice of material for the plasmonic layer 106 closely related to the wavelength of excitation light, as each material may be able to efficiently couple and confine light of a particular range of wavelengths. For example, while an excitation wavelength of about 750 nm or near infrared (NIR) wavelengths may be suitable for a plasmonic layer 106 made of gold or gallium nitride, wavelengths of about 400 nm to about 550 nm may be more suitable for a plasmonic layer 106 made of aluminum or silver.

According to some embodiments, the 3D-tapered structure (and in particular, the taper angle) of the tapered cavity portion 110t provides improved (e.g., optimal) transversal confinement of the electromagnetic field, and thus enables the light captured by the wider first cavity portion 110a to be efficiently focused into the narrow nanochannel of the second cavity portion 110b. The length of the second cavity portion 110b is designed to ensure strong light enhancement (i.e., strong confinement of surface-plasmon-polariton (SPP) modes) at the tip 120, which is where the opening 130 is located. Therefore, the cavity 110 produces a sensor hotspot with high and uniform electromagnetic field intensity at the opening 130. As a result, so long as a target molecule can fit through the opening 130, the return optical signal (e.g., fluorescent, vibrational spectra, or spectroscopic signal) will experience a strong boost, which leads to a high signal-to-noise ratio (SNR) of the optical readout.

In some embodiments, the opening 130 that is created in the plasmonic, insulating, and support layers 106, 104, and 102 enables passive flow of the solution through, and the concentration of the target molecules 132 at, the sensor hot spot (i.e., 120/130). Because the material of the plasmonic layer 106 (e.g., gold) is hydrophobic and the materials of the insulating layer (e.g., silica) and the support layer 102 (e.g., silicon nitride) are hydrophilic, a surface tension gradient is created at the interior walls of the opening 130, which pulls the liquid toward the opening 130 and through it. Additionally, the evaporation of fluid at the bottom end of the opening 130 (near the support layer 102) pulls in further fluid from the top of the opening 130 (near the plasmonic layer 106). However, the evaporation process may be slow and less dominant than the surface tension gradient phenomenon described above. By passively directing the target molecules 132 to the plasmonic hotpot at the opening 130, the plasmonic device 100 enables rapid detection of molecules diffusing in solution at even sub-micromolar concentrations.

In some examples, an absorbent layer 108 may be positioned under support layer 102 that can absorb the fluid leaving the opening 130 thus allowing more fluid to flow through and for the target molecules 132 to better concentrate in the opening 130. The absorbent layer 108 may include absorbent cellulose, sodium polyacrylate, and/or the like. However, embodiments of the present invention are not limited utilizing an absorbent layer, and in some embodiments, an air gap may exist under the opening 130 in lieu of the absorbent layer.

In some embodiments, the opening 130 may be a through-hole (e.g., a nanopore) or a nanoslit that is sized to be slightly larger than the target molecules, which improves (e.g., maximizes) the interaction (e.g., binding) of the target molecules at the interior walls of the opening 130. This, together with the enhanced optical signal from molecules at the plasmonic hostspot (i.e., the opening 130), allows the diagnostics system 1 to perform single-molecule detection with high SNR. In some examples, the opening 130 may be about 5 nm to about 25 nm wide. According to some examples, the volumetric limitation of a 20 nm opening enables a single plasmonic device 100 to detect a wide variety of target molecules, such as single DNA strands, antibodies, protein molecules, etc., which are generally smaller than 20 nm in size. Here, if the opening 130 is too wide relative to the size of the target molecule, the electromagnetic field intensity may decrease near the center of the opening resulting in a weaker non-uniform field intensity, and the target molecules may have fewer interactions with the opening walls and flow through the opening more quickly, all of which may result in a weaker optical readout (e.g., a weaker fluorescence or spectroscopic signal) and lower SNR.

According to some embodiments, the support layer 102 provides the rigidity and structural support necessary to create a stable, thin, free-hanging (e.g., cantilevering) nanophotonic structure, such that when the plasmonic device is milled through at the tip 120, both sides of the resulting opening 130 are open. In some examples, the second plasmonic portion 106b may be about 100 nm thick, the insulation layer 104 may be about 200 nm thick, and the support layer may be about 100 nm to about 500 nm thick. Therefore, the opening may be less than a micron in length (e.g., along the Z direction). If not for the added rigidity of the support layer, it may not be possible to drill an opening/nanopore of such aspect ratio using traditional milling methods without breaking or deforming the plasmonic device at the tip 120. For example, it may be extremely difficult to drill a 20 nm wide hole all the way through a 500 μm thick silicon wafer, as compared to a 200 nm thick silicon nitride membrane.

The layers of the plasmonic device 100 may be fabricated on a silicon substrate 109. In addition to being low cost and readily available, the atomic layer flatness of silicon substrates allows for fabricating layers that also exhibit atomic layer flatness.

While FIGS. 1 and 2 illustrate embodiments in which the plasmonic device 100 includes a single 3D tapered cavity, embodiments of the present invention are not limited thereto.

FIG. 3A illustrate a plan view of a plasmonic device 100-1 including a plurality of 3D cavities, according to some embodiments of the present invention. FIG. 3B illustrates a cross-sectional view of the plasmonic device 100-1 taken along the line AA', according to some embodiments of the present invention.

In some embodiments, a plurality of cavities (e.g., 110-1 to 110-4) may focus excitation light onto a single opening 130 to further increase the strength and uniformity electromagnetic field at the opening 130. Such an arrangement may produce a higher SNR that embodiments that include a single cavity 110. While FIG. 3A illustrates four concentric cavities symmetrically positioned around the opening 130, embodiments of the present invention are not limited thereto, and the plasmonic device 100-1 may include any suitable number of cavities.

While the plasmonic devices 100 and 100-2 of the embodiments of FIGS. 1-3B utilize passive molecule concentration at the sensor hotspot, embodiments of the present invention are not limited thereto. For example, the plasmonic device may utilize magnetic nanofocusing or dielectric trapping to actively concentrate the target molecules at the sensor hotspot.

Figure 4:
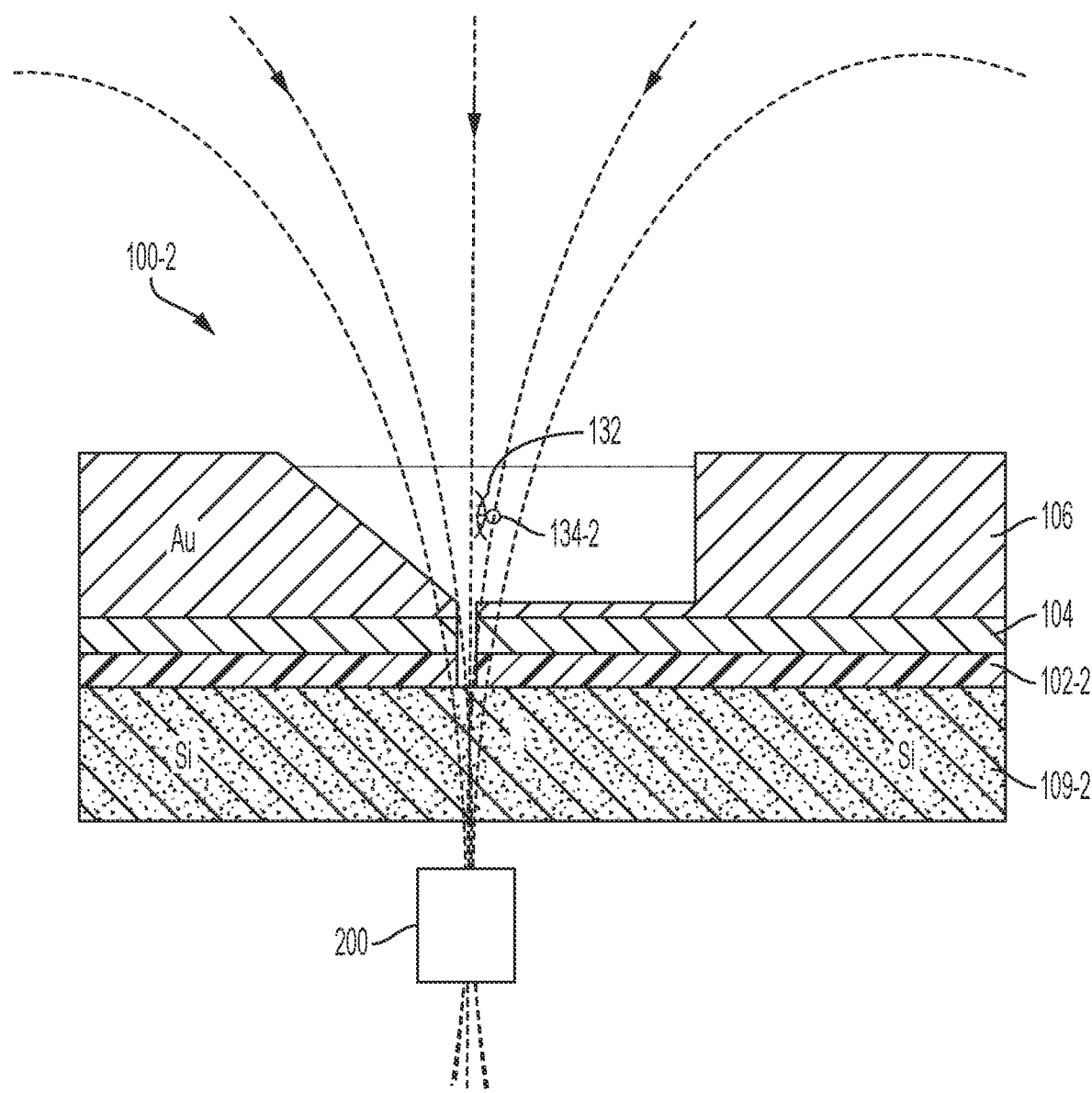
FIG. 4 illustrates a cross-sectional view of a plasmonic device utilizing magnetic nanofocusing for directed fluid flow, according to some embodiments of the present invention.

FIG. 4 illustrates a cross-sectional view of a plasmonic device 100-2 utilizing magnetic nanofocusing for directed fluid flow, according to some embodiments of the present invention. The plasmonic device 100-2 is substantially the same as the plasmonic device 100, except for the support layer 102-2, the substrate 109-2, and the magnetic source 200, and the use of magnetic fluorophores 134-2. For the sake of brevity and conciseness, the description below will focus primarily on the differences between the plasmonic device 100-2 and the plasmonic devices described above with reference to FIGS. 1-3B.

In some embodiments, the plasmonic device 100-2 utilizes magnetic nanofocusing to actively concentrate the target molecules 132 at the plasmonic hotspot (i.e., the opening 130). In such embodiments, the fluorophores 134-2 include magnetic beads that are sensitive to, and can move, in the presence of magnetic field gradients. The magnetic fluorophores 134-2 may include plastic or silica beads with magnetic cores, which have molecule receptors at their exterior surface that can bind with the target molecules 132.

According to some embodiments, the plasmonic device 100-2 includes a magnetic source 200 that generates a magnetic field at the location of the opening 130. Additionally, the support layer 102-2 includes one or more ferromagnetic materials, such as nickel, cobalt, and iron, which serves to strengthen the magnetic field at the opening 130. Because of the sharp spatial gradients at the opening 130, which is at the edge of the 3D taper of the plasmonic layer 106, the application of a uniform magnetic field in the hotpot area produces a strong magnetic field at the opening 130. The strong magnetic field rapidly directs the target molecules 132 captured on magnetic fluorophores 134-2 toward the opening 130 and concentrates the molecules 132 at the sensor hotspot. As a result, the diagnostics system can perform rapid on-chip detection of single molecules with high SNR.

Here, the substrate (e.g., silicon substrate) 109-2 may extend along the underside of the support layer 102-2 and cover the bottom of the opening 130.

Figure 5:
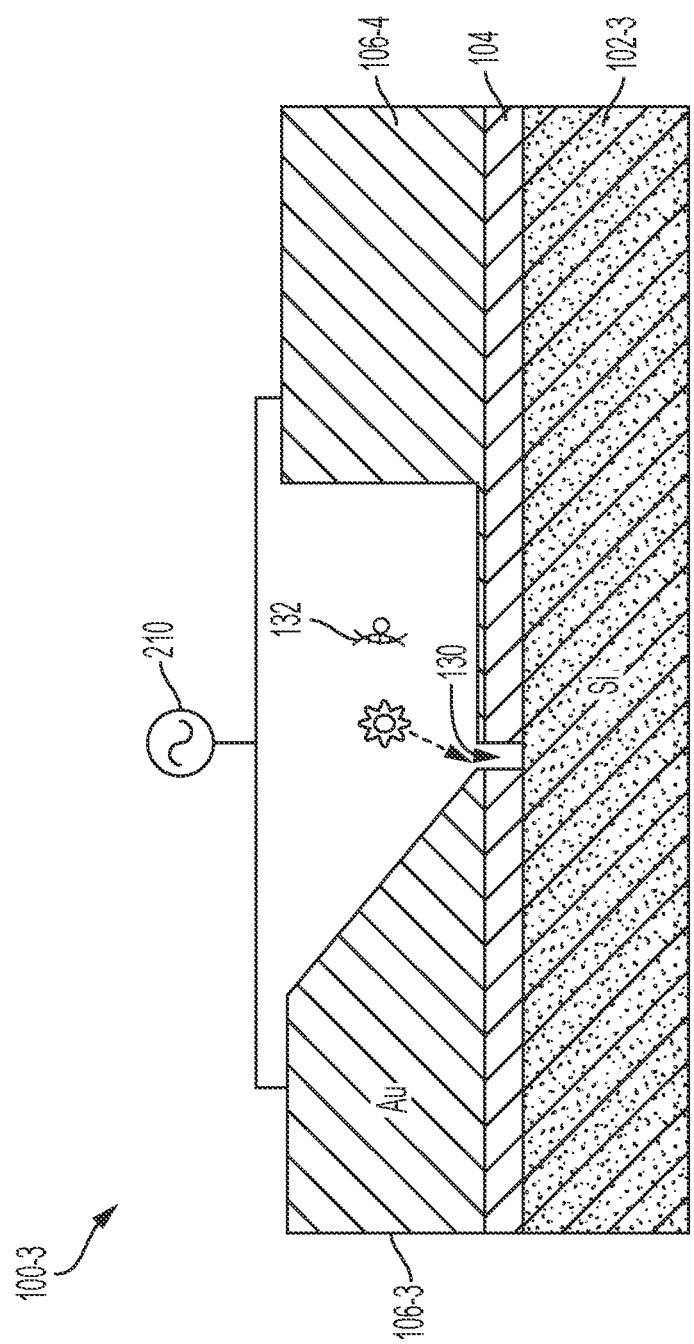
FIG. 5 illustrates a cross-sectional view of a plasmonic device utilizing dielectric nanofocusing for directed fluid flow, according to some embodiments of the present invention.

FIG. 5 illustrates a cross-sectional view of a plasmonic device 100-3 utilizing dielectric nanofocusing for directed fluid flow, according to some embodiments of the present invention. The plasmonic device 100-3 is substantially the same as the plasmonic device 100, except for the electrically isolated first and second portions 106-3 and 106-4 of the plasmonic layer, the support layer 102-3, and the alternating current (AC) source 210. For the sake of brevity and conciseness, the description below will focus primarily on the differences between the plasmonic device 100-3 and the plasmonic devices described above with reference to FIGS. 1-3B.

In some embodiments, the plasmonic device 100-3 utilizes dielectrophoresis to transport target molecules 132 toward the opening 130 to enhance molecular fluorescence and detection of target molecules 132. In such embodiments, the plasmonic layer 106 is divided into two electrically isolated portions 106-3 and 106-4. An AC source 210 applies an AC voltage across the two portions 106-3 and 106-4, which induces an AC electric field across the opening 130 (e.g., a nanogap), resulting in generation of strong gradient electric forces at the gap (i.e., at the opening 130). The non-uniform electric field near the opening 130 exerts a force on the target molecules 132 directing them toward the opening 130 and concentrating the molecules 132 at the sensor hotspot. As a result, the diagnostics system can perform rapid on-chip detection of single molecules with high SNR.

Here, the support layer 102-3 may be a substrate (e.g., silicon substrate) 102-3 that extends along the underside of the insulating layer 104 and covers the bottom of the opening 130.

Figure 6:
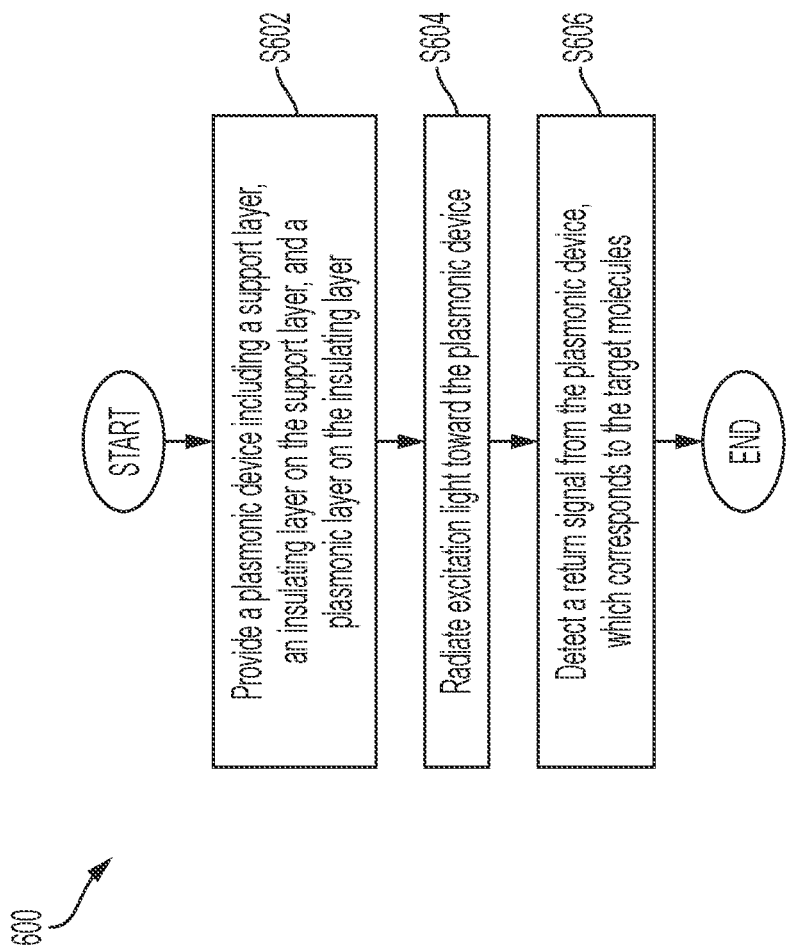
FIG. 6 is a flow diagram illustrating the process of performing single-molecule detection, according to some embodiments of the present invention.

FIG. 6 is a flow diagram illustrating the process 600 of performing single-molecule detection, according to some embodiments of the present invention.

In some embodiments, a plasmonic device 100 is provided, which includes a support layer 102 extending along a first direction (e.g., the X direction) and a second direction (e.g., the Y direction), an insulating layer 104 on the support layer 102, and a plasmonic layer 106 on the insulating layer 104 (S602). The plasmonic layer 106 defines a cavity 110 extending along the first direction, which has a three-dimensionally (3D) tapered structure and is configured to propagate an electromagnetic field along the first direction and to concentrate the electromagnetic field at a tip of the cavity. In some embodiments, the support layer 102, the insulating layer 104, and the plasmonic layer 106 together define an opening 130 therein that is at the tip of the cavity 110 and is configured to pass-through target molecules 132 of a solution present in a well 150 of the plasmonic layer 106.

In some embodiments, the controller 30 sends a control signal to the light source 10 to radiate excitation light toward the plasmonic device 100 (S604), a detector 20 detects a return signal from the plasmonic device 100, which corresponds to the target molecules, and transmits the signal to the controller 30 for processing (S604).

Accordingly, as described above, embodiments of the present invention provide a single-molecule diagnostics system that includes a nano plasmonic device that provides optical enhancement at a sensor hotspot and is also able to concentrate target molecules in the hotspot, resulting in a rapid readout with high SNR. The plasmonic device utilizes a 3D-tapered cavity that has an opening at its end, which can efficiently couple excitation light and confine the light at the site of the opening. The plasmonic device can also direct flow of the target molecule to the opening via passive fluid flow, magnetic nanoconfinement, or dielectric trapping. This allows the optical diagnostics system to visualize single molecules for diverse diagnostics including but not limited to antibody and aptamer assays, NAAT tests (PCR or LAMP), DNA and protein sequencing, and/or the like.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first," "second," "third," etc., may be used herein to describe various elements, components, and/or sections, these elements, components, and/or sections should not be limited by these terms. These terms are used to distinguish one element, component, or section from another element, component, or section. Thus, a first element, component, or section discussed above could be termed a second element, component, or section, without departing from the spirit and scope of the invention.

It will be understood that the spatially relative terms used herein are intended to encompass different orientations of the device in use or in operation, in addition to the orientation depicted in the figures. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the invention. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the invention refers to "one or more embodiments of the invention." Also, the term "exemplary" is intended to refer to an example or illustration.

It will be understood that when an element or component is referred to as being "connected to" or "coupled to" another element or component, it can be directly connected to or coupled to the other element or component, or one or more intervening elements or components may be present. When an element or layer is referred to as being "directly connected to" or "directly coupled to" another element or component, there are no intervening elements or components present.

As used herein, the terms "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

The controller and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on the same substrate. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that suitable alterations and changes in the described structures and methods can be practiced without meaningfully departing from the principles, spirit, and scope of this invention, as set forth in the following claims and equivalents thereof.

What is claimed is:

1. A plasmonic device comprising:
   a support layer extending along a first direction and a second direction;
   an insulating layer on the support layer; and a distinct plasmonic layer disposed on top of the insulating layer and defining a cavity extending along the first direction, the cavity having a three-dimensionally (3D) tapered structure and being configured to propagate an electromagnetic field along the first direction and to concentrate the electromagnetic field at a tip of the cavity, wherein an opening is formed through all of the support layer, the insulating layer, and the plasmonic layer, the opening being at the tip of the cavity and being configured to pass-through target molecules of a solution present on the plasmonic layer.

2. The plasmonic device of claim 1, wherein the cavity exposes the insulating layer in a plan view.

3. The plasmonic device of claim 1, wherein the cavity has a first cavity portion having a first width and a first thickness, a tapered cavity portion having a tapered width along the first direction and a tapered thickness along a third direction crossing the first and second directions, and a second cavity portion having a second width and a second thickness, and
   wherein the tip of the cavity is at an end of the second cavity portion.

4. The plasmonic device of claim 3, wherein the plasmonic layer comprises:
a first plasmonic portion having the first thickness;
a second plasmonic portion having the second thickness; and
a tapered plasmonic portion between the first and second plasmonic portions and having the tapered thickness.

5. The plasmonic device of claim 4, wherein the tapered plasmonic portion is tapered along the third direction.

6. The plasmonic device of claim 3, wherein the second width is less than the first width, and the second thickness is less than the first thickness.

7. The plasmonic device of claim 1, wherein the plasmonic layer comprises hydrophobic material and the insulating layer comprises hydrophilic material, and
wherein the insulating layer is configured to attract fluid present on the plasmonic layer into the opening.

8. The plasmonic device of claim 1, wherein the plasmonic layer comprises gold, the insulating layer comprises silica, and the support layer comprises silicon nitride.

9. The plasmonic device of claim 1, wherein the support layer is configured to provide structural support to the plasmonic and insulating layers to create a free-hanging structure with both sides of the opening being open, and
wherein plasmonic device further comprises an absorbent layer below the support layer, the absorbent layer being configured to absorb fluid leaving a bottom of the opening.

10. The plasmonic device of claim 1, wherein the opening is a fluidic channel configured to enable passive flow of the solution and concentration of a target molecule of the solution in the opening via at least one of evaporation and surface-tension gradients.

11. The plasmonic device of claim 1, wherein the opening has a width of 5 nm to 25 nm.

12. The plasmonic device of claim 1, wherein the plasmonic layer comprises gold, the insulating layer comprises silica, and the support layer comprises ferromagnetic material comprising at least one of nickel, iron, and cobalt.

13. The plasmonic device of claim 12, further comprising a substrate below the support layer,
wherein the opening exposes a top surface of the substrate in a plan view.

14. The plasmonic device of claim 12, wherein the solution comprises target molecules bound to magnetic nanoparticles, and
wherein the opening is configured to enable concentration of the target molecules of the solution in the opening by attracting the magnetic nanoparticles toward a portion of the support layer exposed by the opening.

15. The plasmonic device of claim 1, wherein the plasmonic layer comprises:
a first portion comprising:
a first plasmonic portion having a first thickness;
a second plasmonic portion having a second thickness;
a tapered plasmonic portion between the first and second plasmonic portions and having a tapered thickness; and
a second portion electrically isolated from the first portion,
wherein the opening is a transverse gap physically separating the second and third plasmonic portions of the plasmonic layer, and
wherein the support layer is a substrate defining a bottom of the transverse gap.

16. The plasmonic device of claim 15, wherein, in the presence of an alternating current (AC) electric field across the transverse gap, target molecules of the solution are directed to the opening via dielectrophoresis.

17. An optical diagnostics system comprising:
a plasmonic device comprising: a support layer extending along a first direction and a second direction; an insulating layer on the support layer; and a distinct plasmonic layer disposed on top of the insulating layer and defining a cavity extending along the first direction, the cavity having a three-dimensionally (3D) tapered structure and being configured to propagate an electromagnetic field along the first direction and to concentrate the electromagnetic field at a tip of the cavity,
wherein an opening is formed through all of the support layer, the insulating layer, and the plasmonic layer, the opening being at the tip of the cavity and being configured to pass through target molecules of a solution present on the plasmonic layer;
a light source configured to radiate excitation light to the plasmonic device; and a detector configured to detect a return signal from the plasmonic device.

18. The optical diagnostics system of claim 17, wherein the return signal is a spectral signal or a fluorescent signal emitted by a fluorophore bound to a target molecule of the solution in response to excitation by the excitation light.

19. The optical diagnostics system of claim 17, wherein the cavity is laterally and vertically tapered, and
wherein the opening is a fluidic channel configured to enable passive flow of the solution and concentration of a target molecule of the solution in the opening via at least one of evaporation and surface-tension gradients.

20. A method of performing single-molecule detection, the method comprising: providing a plasmonic device comprising: a support layer extending along a first direction and a second direction; an insulating layer on the support layer; and a distinct plasmonic layer disposed on top of the insulating layer and defining a cavity extending along the first direction, the cavity having a three-dimensionally (3D) tapered structure and being configured to propagate an electromagnetic field along the first direction and to concentrate the electromagnetic field at a tip of the cavity,
wherein an opening is formed through all of the support layer, the insulating layer, and the plasmonic layer, the opening being at the tip of the cavity and being configured to pass-through target molecules of a solution present on the plasmonic layer;
radiating excitation light toward the plasmonic device; and detecting a return signal from the plasmonic device, the return signal corresponding to the target molecules.

* * * * *